US011265366B2

(12) United States Patent
Stefanov et al.

(10) Patent No.: US 11,265,366 B2
(45) Date of Patent: *Mar. 1, 2022

(54) LIFECYCLE MANAGEMENT OF CUSTOM RESOURCES IN A CLOUD COMPUTING ENVIRONMENT

(71) Applicant: VMware, Inc., Palo Alto, CA (US)

(72) Inventors: Kiril Angelov Stefanov, Sofia (BG); Boris Savov, Sofia (BG); Rostislav Georgiev, Sofia (BG); Ventsyslav Raikov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,189

(22) Filed: Jul. 19, 2019

(65) Prior Publication Data

US 2019/0342375 A1 Nov. 7, 2019

Related U.S. Application Data

(63) Continuation of application No. 15/360,632, filed on Nov. 23, 2016, now Pat. No. 10,362,096.

(51) Int. Cl.
*H04L 29/08* (2006.01)
*H04L 12/24* (2006.01)
(Continued)

(52) U.S. Cl.
CPC .......... *H04L 67/10* (2013.01); *H04L 41/5045* (2013.01); *H04L 41/5048* (2013.01); *H04L 41/5096* (2013.01)

(58) Field of Classification Search
CPC . H04L 67/10; H04L 41/5045; H04L 41/5048; H04L 41/5096
(Continued)

(56) References Cited

U.S. PATENT DOCUMENTS 7,466,710 B1 * 12/2008 Clemm ............... H04L 41/0873
370/401
8,171,485 B2 5/2012 Muller
(Continued)

FOREIGN PATENT DOCUMENTS

WO WO 2015184497 A1 * 10/2015 ............. G06F 17/30
WO 2015184497 12/2015

OTHER PUBLICATIONS

Bijjahalli, "Broker Enhances Lifecycle," vRealize Automation 7.0, retrieved Dec. 7, 2016, 8 pages, https://blogs.vmware.com/management/2015/11/vrealize-automation-7-0-new-event-broker-enhances-lifecycle-extensibility.html.

(Continued)

*Primary Examiner* — Kevin T Bates
*Assistant Examiner* — Chen-Liang Huang
(74) *Attorney, Agent, or Firm* — Hanley, Flight & Zimmerman, LLC

(57) ABSTRACT

Example virtual appliances disclosed herein include processor circuitry to accept a resource definition of a custom resource to be executed in a cloud computing environment. Disclosed example virtual appliances also include a lifecycle manager to manage a lifecycle of the custom resource based on a state machine. Disclosed example virtual appliances further include a database to: (i) query the lifecycle manager for a set of operations available to execute in a current lifecycle state of the custom resource; (ii) update a catalog item for the custom resource to present the set of operations available to execute in the current lifecycle state of the custom resource, the catalog item created based on the resource definition of the custom resource; and (iii) in response to selection of a first operation in the set of operations, send a message to cause the processor circuitry to execute the first operation.

15 Claims, 10 Drawing Sheets

(51) Int. Cl.
  *H04L 67/10* (2022.01)
  *H04L 41/5041* (2022.01)
  *H04L 41/50* (2022.01)

(58) Field of Classification Search
  USPC .......................................................... 709/223
  See application file for complete search history.

(56) References Cited

U.S. PATENT DOCUMENTS

| | | | |
|---|---|---|---|
| 10,031,729 B1* | 7/2018 | Totals | G06F 8/38 |
| 10,360,190 B2* | 7/2019 | Hansen | G06F 16/2365 |
| 2003/0120502 A1* | 6/2003 | Robb | H04M 15/63 |
| | | | 705/34 |
| 2005/0246235 A1* | 11/2005 | Wilczynski | G06Q 30/0601 |
| | | | 705/26.1 |
| 2007/0271306 A1 | 11/2007 | Brown et al. | |
| 2014/0181816 A1 | 6/2014 | Muller et al. | |
| 2014/0237366 A1* | 8/2014 | Poulos | G06F 3/011 |
| | | | 715/728 |
| 2017/0010910 A1* | 1/2017 | Bartsch | H04L 67/42 |
| 2017/0124617 A1* | 5/2017 | Spoelstra | G06Q 30/0621 |
| 2018/0145884 A1 | 5/2018 | Stefanov et al. | |

OTHER PUBLICATIONS

United States Patent and Trademark Office, "Notice of Allowance," dated in connection with U.S. Appl. No. 15/360,632, on Mar. 13, 2019, 8 pages.

United States Patent and Trademark Office, "Non-final Office Action," dated in connection with U.S. Appl. No. 15/360,632, on Sep. 13, 2018, 18 pages.

United States Patent and Trademark Office, "Notice of Allowability," dated in connection with U.S. Appl. No. 15/360,632, on Apr. 11, 2019, 2 pages.

\* cited by examiner

LIFECYCLE MANAGEMENT OF CUSTOM RESOURCES IN A CLOUD COMPUTING ENVIRONMENT

RELATED APPLICATION(S)

This patent arises from a continuation of U.S. patent application Ser. No. 15/360,632 (now U.S. Pat. No. 10,362, 096), which is entitled "LIFECYCLE MANAGEMENT OF CUSTOM RESOURCES IN A CLOUD COMPUTING ENVIRONMENT," and which was filed on Nov. 23, 2016. Priority to U.S. patent application Ser. No. 15/360,632 is hereby expressly claimed. U.S. patent application Ser. No. 15/360,632 is hereby incorporated by reference in its entirety.

FIELD OF THE DISCLOSURE

The present disclosure relates generally to cloud computing and, more particularly, to lifecycle management of custom resources in a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Figure 1:
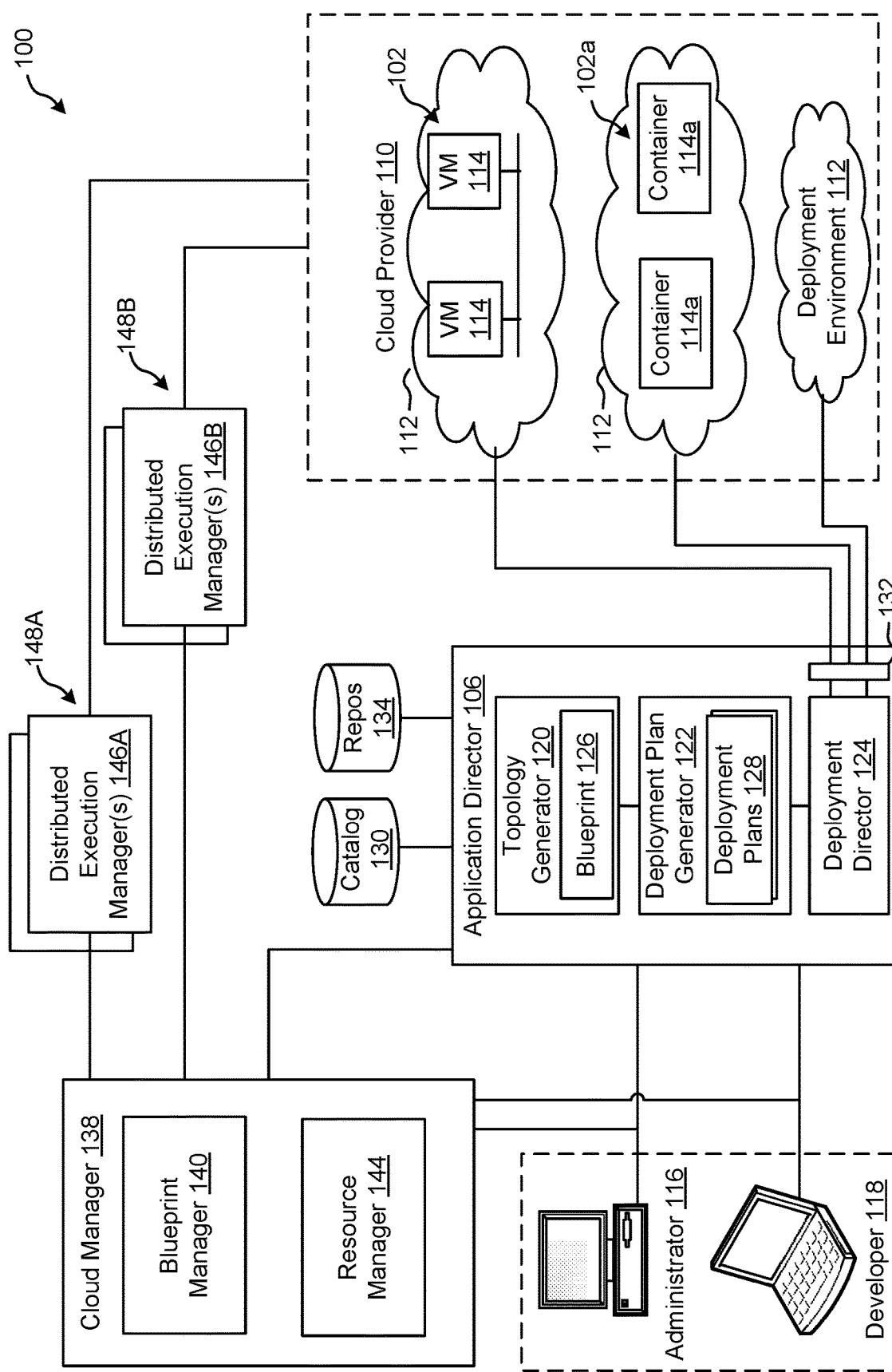
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their respective entireties.

Cloud computing platforms may provide many powerful capabilities for performing computing operations. However, taking advantage of these computing capabilities manually may be complex and/or require significant training and/or expertise. Prior techniques to provide cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

Example methods and apparatus disclosed herein provide for automation of management tasks, such as provisioning multiple virtual machines for a multiple-machine computing system (e.g., a group of servers that inter-operate), linking provisioned virtual machines and tasks to desired systems to execute those virtual machines or tasks, reclaiming cloud computing resources that are no longer in use, and/or lifecycle management of custom resources created by customers, etc. The improvements to cloud management systems (e.g., the vCloud Automation Center (vCAC) from VMware®, the vRealize Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Cloud Management

Prior cloud management systems usually are limited to managing a predefined set of virtual infrastructure resources, such as predefined virtual machines, storage, networks, etc. Furthermore, prior cloud management systems do not provide mechanisms for modeling and managing other types of resources, such as users, security groups, firewalls, load balancers, etc., or any other resource that is not already predefined in the system. However, customers of cloud computing platforms and services may want to create custom resources having customer-defined lifecycle states, customer-defined transitions between lifecycle states, customer-defined events causing state transitions, customer-defined operation(s) available at each state, hook customer-defined operation(s) to specific state transitions, etc. In view of the above-mentioned limitations of prior cloud management systems, such prior systems are unable to provide lifecycle management of custom resources without involving manually-intensive, customized software programming.

Unlike such prior systems, example cloud management systems (e.g., such as the vRealize Automation Cloud Automation Software from VMware®) that are enhanced to implement lifecycle management of custom resources as disclosed herein provide an extensibility service that allows a customer to register a custom resource for lifecycle management, and to register the custom resource's lifecycle states, transitions between states, operations available at each state, etc., in a declarative way. As disclosed in further detail below, the extensibility service further utilizes a state machine implemented by a disclosed example lifecycle manager and, in some examples, further utilizes an event-based messaging system implemented by a disclosed example event broker, to manage and monitor the lifecycle states of registered custom resources. In some disclosed examples, the extensibility service enables definitions specifying a custom resource and its lifecycle characteristics to be provided in a human-readable data format, such as YAML (Yet Another Markup Language), JSON (JavaScript Object Notation), etc., and/or via a user interface implemented by, for example, such as a webpage form, a client application, etc. In some such disclosed example cloud management systems, registration of custom resources can involve no service down time.

For example, some example methods for custom resource lifecycle management disclosed herein include accepting, with an extensibility service implemented by a virtual appliance, a resource definition and a lifecycle definition for a custom resource to be executed by a service provider in a cloud computing environment. Disclosed example methods also include managing, with a lifecycle manager implemented by the virtual appliance, a lifecycle of the custom resource based on a state machine implemented according to the lifecycle definition for the custom resource. Disclosed example methods further include providing, with a catalog implemented by the virtual appliance, a catalog item for the custom resource, the catalog item based on the resource definition for the custom resource.

In some such disclosed example methods, the lifecycle definition specifies a set of lifecycle states supported by the custom resource, and the resource definition specifies a name of the custom resource and details of the custom resource to be presented in the catalog item for the custom resource. Some such disclosed example methods also include publishing the resource definition to the catalog for inclusion in the catalog item for the custom resource. Additionally or alternatively, some such disclosed example methods include publishing the lifecycle definition to the lifecycle manager for implementing the state machine based on the set of lifecycle states.

Additionally or alternatively, in some such disclosed example methods, the lifecycle definition further specifies respective sets of operations available for execution in respective ones of the lifecycle states supported by the custom resource, and permitted transitions among the lifecycle states supported by the custom resource. Some such disclosed example methods further include, in response to a user query of the catalog associated with the custom resource, querying the lifecycle manager to obtain a first set of operations available for execution in a current lifecycle state of the custom resource, and updating the catalog item to include information specifying the first set of operations available for execution in the current lifecycle state of the custom resource. Some such disclosed example methods also include, in response to a first message from the catalog identifying a first one of the first set of operations specified in the catalog item has been selected for execution, sending a second message from the lifecycle manager to the service provider to instruct the service provider to execute the first one of the first set of operations. Such disclosed example methods can further include sending a third message from the lifecycle manager to the catalog to confirm the first one of the first set of operations has been executed, and updating the current lifecycle state of the custom resource according to the state machine implemented by the lifecycle manager.

In some disclosed example methods, prior to sending the second message from the lifecycle manager to the service provider, the example methods further include sending a first event from the lifecycle manager to an event broker to indicate the first one of the first set of operations for the custom resource has been selected for execution. Some such disclosed example methods further include publishing, via the event broker, the first event to inform a subscribed component of the cloud computing environment that the first one of the first set of operations for the custom resource has been selected for execution. Additionally or alternatively, in some disclosed example methods, prior to sending the third message from lifecycle manager to the catalog to confirm the first one of the first set of operations has been executed, the example methods further include sending a second event from the lifecycle manager to the event broker to indicate the first one of the first set of operations for the custom resource has been executed. Some such disclosed example methods further include publishing, via the event broker, the second event to inform the subscribed component of the cloud computing environment that the first one of the first set of operations for the custom resource has been executed.

These and other example methods, apparatus, systems and articles of manufacture (e.g., physical storage media) to implement lifecycle management of custom resources in a cloud computing environment are disclosed in further detail below Illustrated Examples FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment. The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
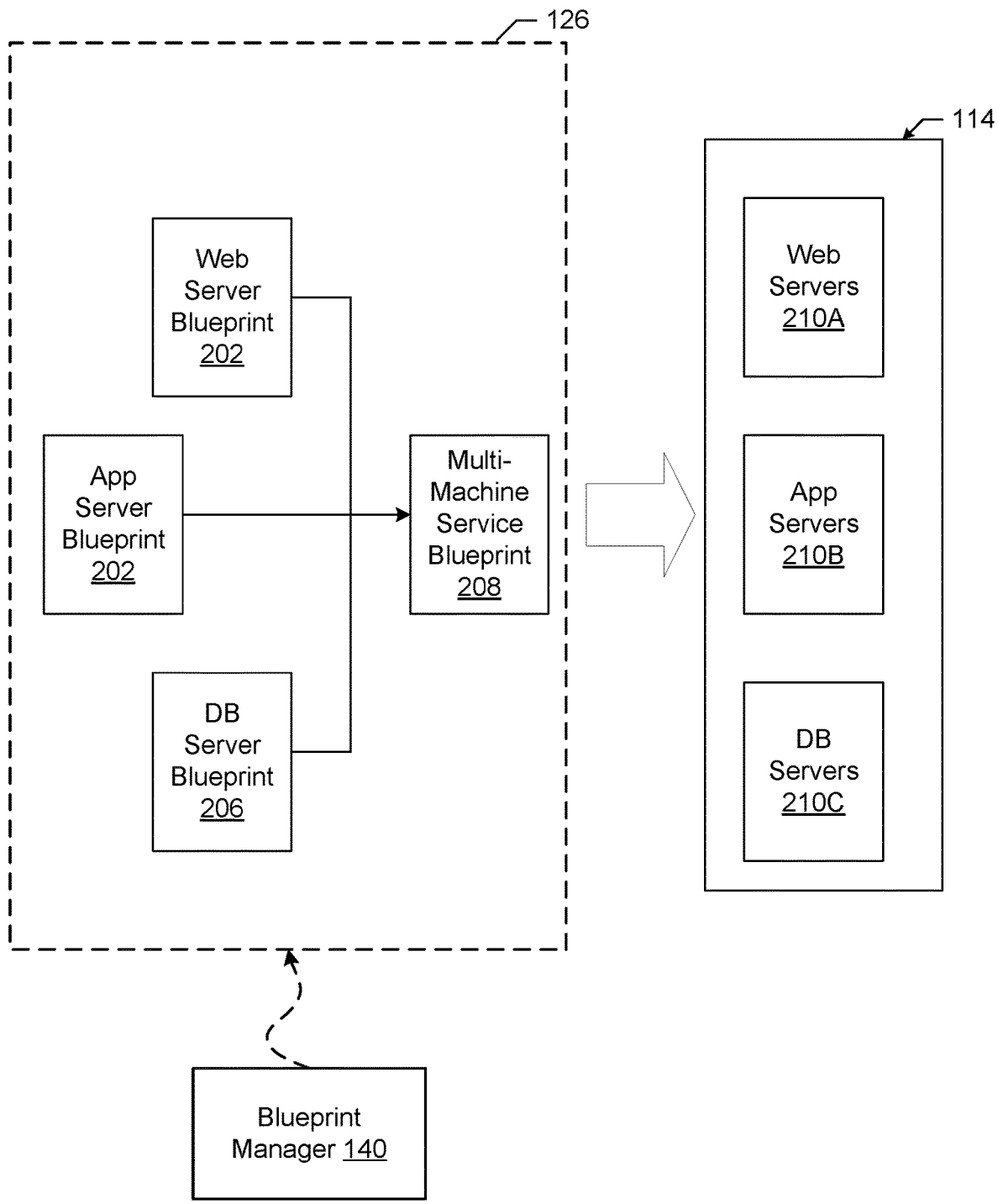
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premises virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
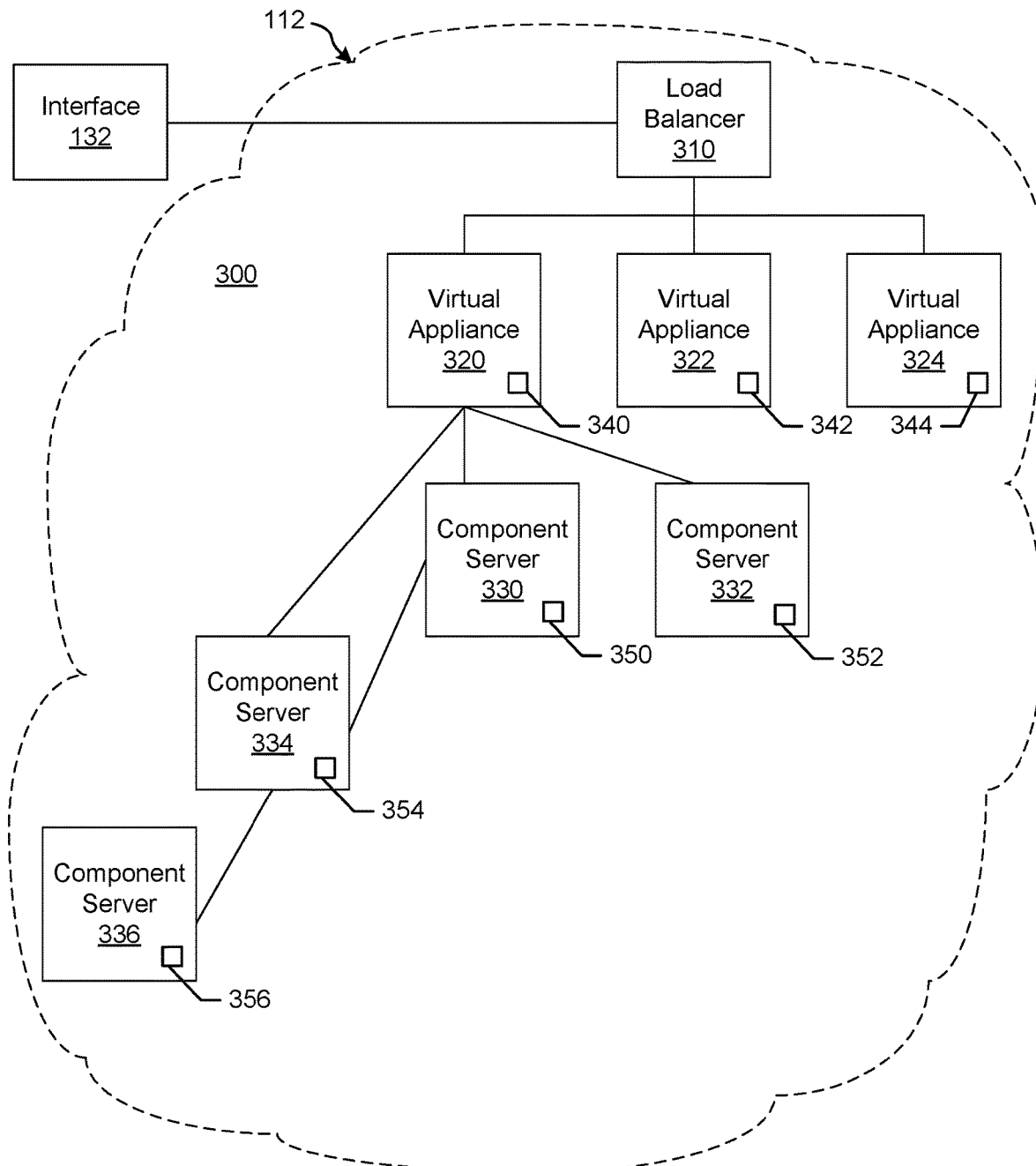
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premises automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
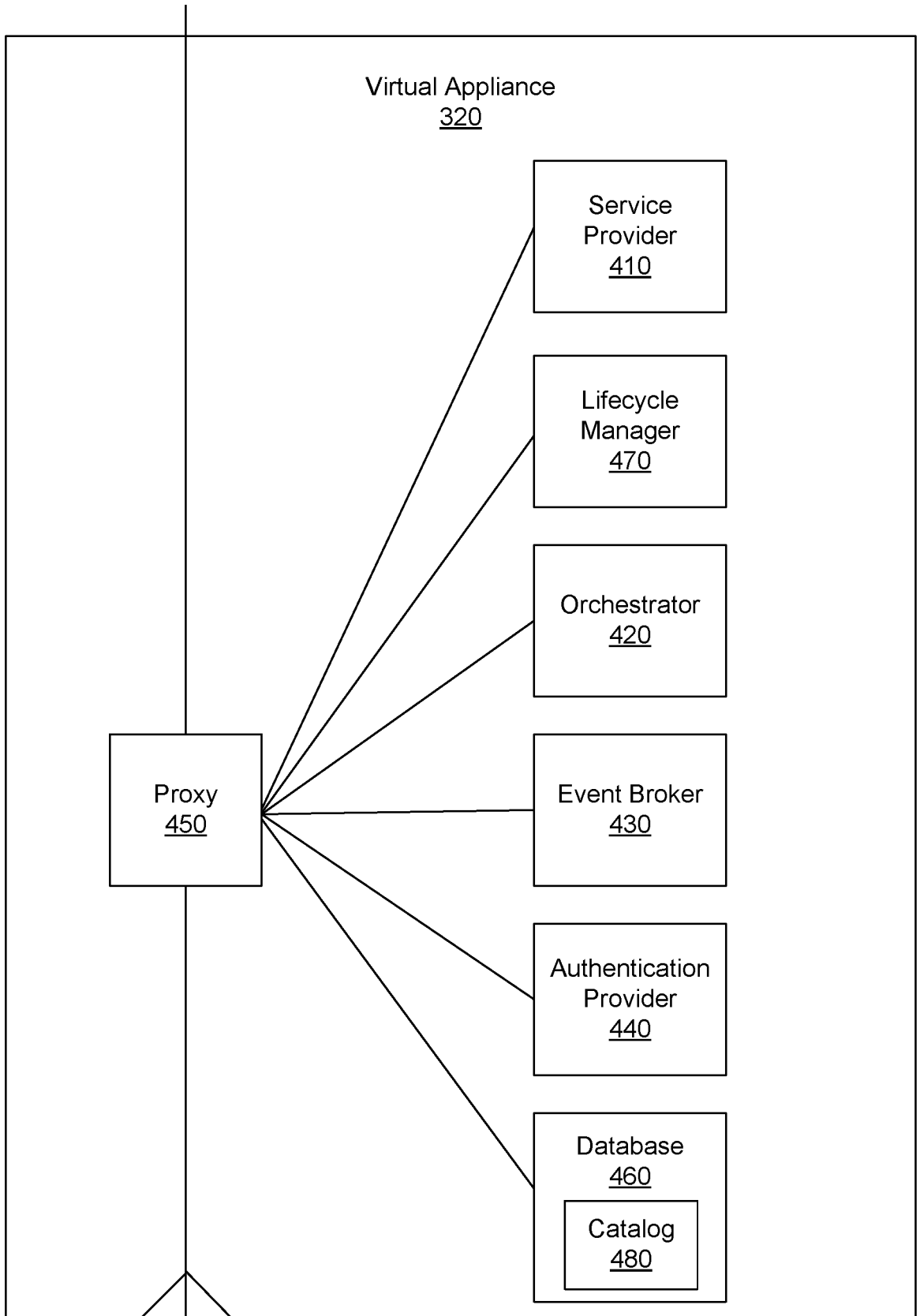
FIG. 4 illustrates an example implementation of a virtual appliance capable of providing lifecycle management of custom resources in accordance with the teachings of this disclosure.

FIG. 4 illustrates an example implementation of the vA 320. In the example of FIG. 4, the vA 320 includes an example service provider 410, an example orchestrator 420, an example event broker 430, an example authentication provider 440, an example internal reverse proxy 450, an example database 460 and an example lifecycle manager 470. The components 410, 420, 430, 440, 450, 460, 470 of the vA 320 may be implemented by one or more of the VMs 114. The example service provider 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS ("Anything-as-a-Service"), etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker 430 provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

The example vA 320 of FIG. 4 further includes the example lifecycle manager 470 that, in combination with the example service provider 410, the example event broker 430 and an example catalog 480 provided by the example database 460, implement an example lifecycle service to perform lifecycle management of custom resources in accordance with the teachings of this disclosure. The example lifecycle service implemented by the vA 320 enables a customer, such as the administrator 116, a system architect, etc., or any other authorized user, to create and manage custom virtual computing resources (also referred to herein as custom resources) that may be provisioned via the example service provider 410 for use a cloud computing environment. The custom resources supported by the lifecycle service include, for example, virtual infrastructure resources, such as custom-defined virtual machines, storage, networks, etc. However, the custom resources that are supported by the lifecycle service are not limited to infrastructure resources but, rather, can be any type of resource, such as users, security groups, firewalls, load balancers, etc., or any other resource that is not already predefined in the system. An example custom resource capable of being created and managed by the example lifecycle service, which is used by way of example throughout this disclosure, is an Active Directory (AD) User custom resource, which is described in further detail below.

In the illustrated example of FIG. 4, service provider 410 implements an example extensibility service that allows a customer to register a custom resource for lifecycle management. The example extensibility service implemented by the service provider 410 includes an interface to accept definitions specifying a custom resource and its lifecycle characteristics. In some examples, the interface provided by the extensibility service accepts resource and lifecycle definitions in one or more human-readable data formats, such as YAML, JSON, etc., and/or via a user interface implemented by, for example, such as a webpage form, a client application, etc. As disclosed in further detail below, the interface provided by the extensibility service implemented by the service provider 410 accepts a resource definition for a custom resource, which specifies, for example, the name of the custom resource and details of the custom resource to be presented in a catalog item maintained for the custom resource in the catalog 480. As disclosed in further detail below, the interface provided by the extensibility service implemented by the service provider 410 also accepts a lifecycle definition for a custom resource, which specifies, for example, customer-defined lifecycle states for custom resource, customer-defined transitions between lifecycle states, customer-defined events causing state transitions, customer-defined operation(s) available at each state, etc. The service provider 410 of the illustrated example further invokes any appropriate IaaS functionality, SaaS ("Software-as-a-Service") functionality, PaaS ("Platform-as-a-Service") functionality and/or, more generally, any appropriate XaaS functionality to execute the operations defined by the customer for the custom resource.

In the illustrated example of FIG. 4, after accepting a resource definition and lifecycle definition for a custom resource, the service provider 410 publishes the resource definition to the catalog 480. The catalog 480 uses the resource definition to create and maintain a catalog item for the custom resource. For example, the example catalog 480 may be similar to (or correspond to) the example catalog 130 and provide an interface to enable a customer to access the catalog item for the custom resource to provision or otherwise use the custom resource. As disclosed in further detail below, because the custom resource is managed by the lifecycle service implemented by the example vA 320, the catalog 480 is able to tailor the catalog item for the custom resource to present, in some examples, only the set of specific operations which are available for the custom resource in its current lifecycle state (e.g., to hide operation(s) that are not available in the current lifecycle state of the custom resource). In other words, the catalog 480 is able to tailor the catalog item for a particular custom resource based on the resource's current lifecycle state, thereby simplifying the provisioning and use of the custom resource.

In the illustrated example of FIG. 4, after accepting the resource definition and lifecycle definition for the custom resource, the service provider 410 also publishes the lifecycle definition to the catalog lifecycle manager 470 to enable the lifecycle manager 470 to manage the lifecycle of the custom resource. The lifecycle manager 470 uses the lifecycle definition to create and maintain a state machine modeling the operational lifecycle of the registered custom resource. For example, upon receiving the published lifecycle definition for the custom resource, the lifecycle manager 470 of the illustrated example defines a state machine having states corresponding to the lifecycle states specified in the lifecycle definition. The example lifecycle manager 470 then defines the possible transitions between the states of the state machine using the lifecycle state transitions specified in the lifecycle definition. Furthermore, for respective ones of the lifecycle states modeled by the state machine, the lifecycle manager 470 of the illustrated example can use the operations and events specified in the lifecycle definition to define the set of operations available at that state, if any, and/or the event(s) triggering state transition(s) to other state(s). As disclosed in further detail below, the lifecycle manager 470 interacts with the catalog 480, the service provider 410 and, in some examples, the event broker 430 to track the current lifecycle state of the custom resource according to the state machine defined for the custom resource.

Figure 5:
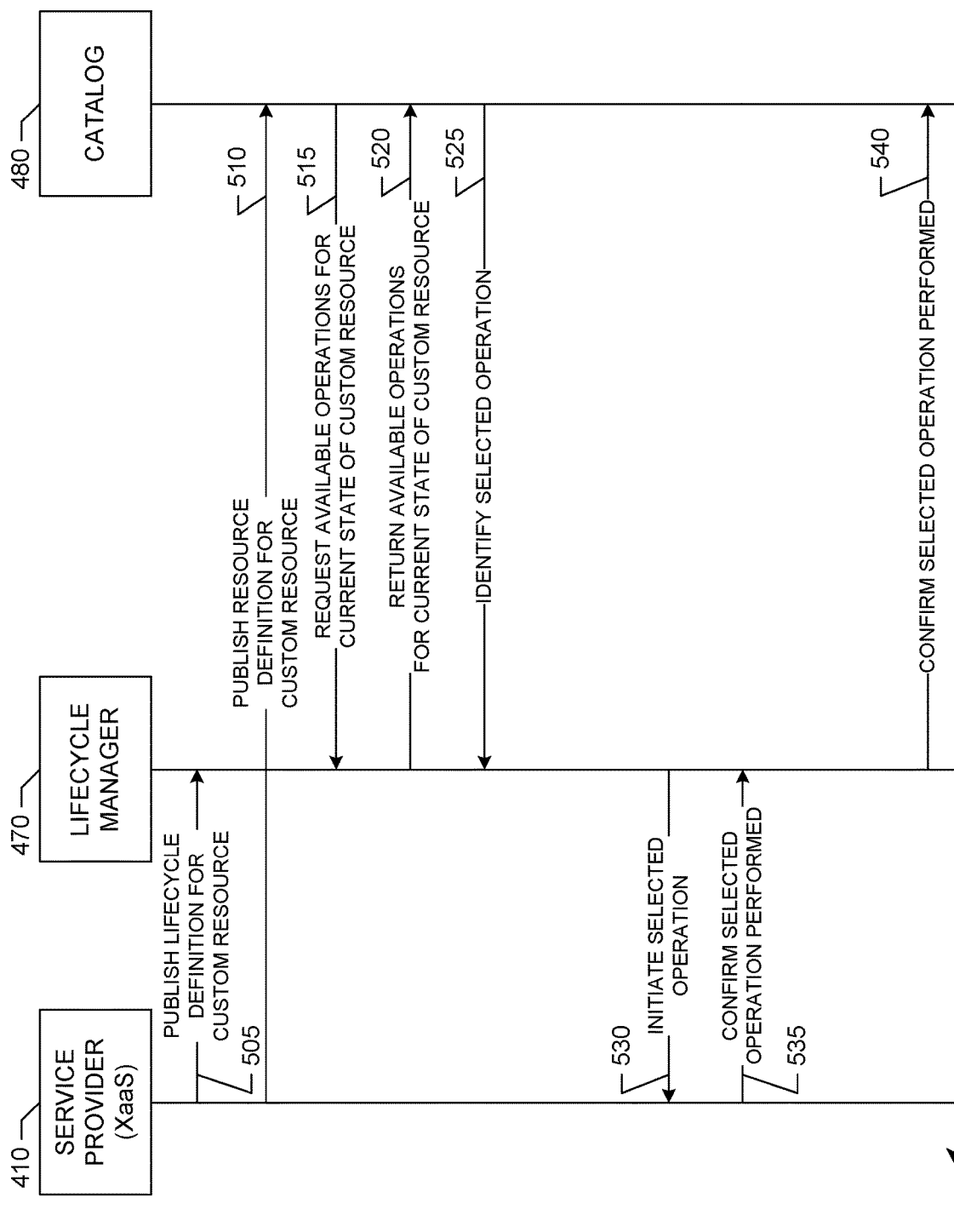
FIG. 5 is a first message sequence diagram illustrating first example messages exchanged by example components of the example virtual appliance of FIG. 4 to provide lifecycle management of custom resources in accordance with the teachings of this disclosure.
Figure 6:
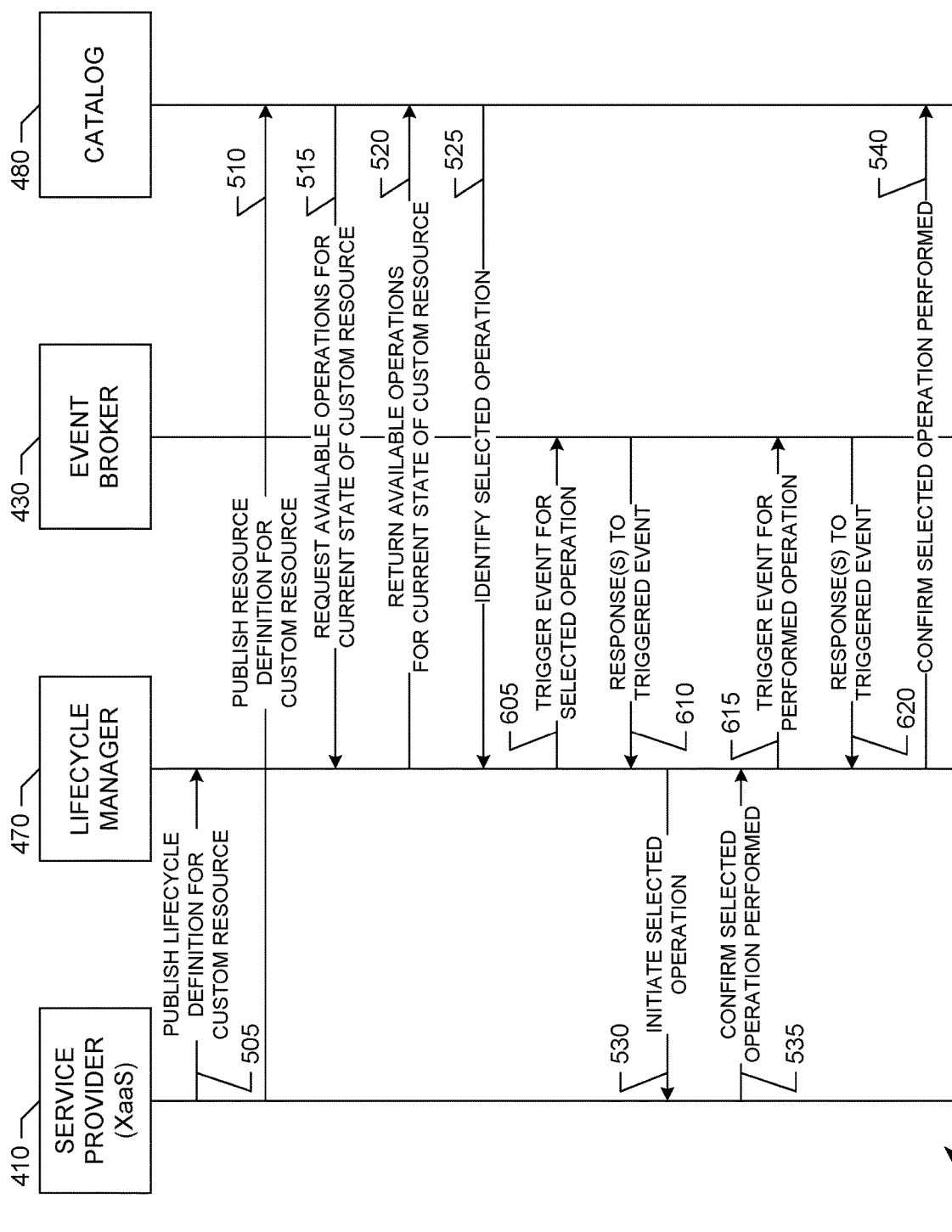
FIG. 6 is a second message sequence diagram illustrating second example messages exchanged by example components of the example virtual appliance of FIG. 4 to provide lifecycle management of custom resources in accordance with the teachings of this disclosure.

Example message sequence diagrams 500 and 600 that illustrate example interactions between the example service provider 410, the example event broker 430, the example lifecycle manager 470 and the example catalog 480 to implement an example lifecycle service are provided in FIGS. 5 and 6, respectively. The example message sequence diagram 500 of FIG. 5 begins with the service provider 410 receiving, via the interface provided by its extensibility service, a resource definition and a lifecycle definition for a custom resource in a declarative manner. The resource definition specifies, for example, the name of the custom resource and details of the custom resource to be published in a catalog item maintained by the catalog 480 for the custom resource. The lifecycle definition specifies, for example, the customer-defined lifecycle states for the custom resource, the customer-defined transitions between lifecycle states, the customer-defined events causing state transitions, the customer-defined operation(s) available at each state, etc.

By way of example, Table 1 illustrates an example lifecycle definition for an example AD User custom resource. In this example, the AD User resource is a custom resource that can be provisioned and invoked by a customer to create a user for an active directory associated with a VM, lock the user account, unlock the user account, rename a user attribute, change the user password, etc., and otherwise maintain the user account and, when appropriate, destroy the user account (e.g., to decommission a VM and clear the active directory of that VM's users, etc.). In the illustrated example, a customer defines the AD User resource via the service provider 410 as an XaaS resource by specifying the resource definition and the lifecycle definition of Table 1. The resource definition for this example AD User resource can include, for example, information to be displayed in the catalog item for the managed AD user, such as, but not limited to, an account name, a distinguished name, an indication of whether the account is enabled, an email address, manager information, etc. As shown in the example of Table 1, the lifecycle definition defines the lifecycle states of the AD User resource, which include states (e.g., identified by the "id" keyword), such as "created" (e.g., but not yet activated), "enabled" (e.g., activated), "disabled," "destroyed," etc. The example lifecycle definition also defines the possible transitions among the states (e.g., identified by the "transitions" keyword) as well as the events causing the defined transitions (e.g., identified by the "event" keyword). Furthermore, the example lifecycle definition defines the set of operations available at each state (e.g., identified by the "action" keyword). For example, an operation to change a user password may be available in the "enabled" state but not in the "created" state because the user password cannot be changed until the account is enabled.

TABLE 1

Example Lifecycle Definition for AD User

```
Sample Definition
AD:User.yaml
!lifecycleDefinition
tenantId:            qe
resourceTypeId:      AD:USER
serviceTypeId:       com.vmware.csp.core.designer.service
name:                Active Directory User
description: |

This is an example how to define
                     state machine with YAML
states:
                     - id: CREATED
                       name: Created
                       type: initial
                       definition: id==null
# action:
# type: routine
# serviceTypeId: com.vmware.csp.core.o11n.gateway
# routineId: calculate the next state
                       action:
                           sendEvent:
                               event: ENABLE
                       transitions:
                           - event: ENABLE
                           action:
                               routine:
                                   serviceTypeId: com.vmware.csp.core.o11n.gateway
                                   routineId: Enable a user
                           target: ENABLED
                           - event: DISABLE
                           action:
                               routine:
                                   serviceTypeId: com.vmware.csp.core.o11n.gateway
                                   routineId: Disable a user
                           target: DISABLED
                     - id: ENABLED
                       name: Enabled
                       definition: id != null and enabled==true
                       transitions:
                           - event: DISABLE
                           action:
                               routine:
                                   serviceTypeId: com.vmware.csp.core.o11n.gateway
                                   routineId: Disable a user
```

TABLE 1-continued

Example Lifecycle Definition for AD User

```
            target: DISABLED
          - event: ADD_TO_GROUP
            action:
                    routine:
                            serviceTypeId: com.vmware.csp.core.o11n.gateway
                            routineId: Add a user to a user group)
          - event: REMOVE_FROM_GROUP
            action:
                    routine:
                            serviceTypeId: com.vmware.csp.core.o11n.gateway
                            routineId: Remove a user from a user group
          - event: CHANGE_A_GROUP
            action:
                    routine:
                            serviceTypeId: com.vmware.csp.core.o11n.gateway
                            routineId: Change a user group
          - event: DESTROY
            action:
                    routine:
                            serviceTypeId: com.vmware.csp.core.o11n.gateway
                            routineId: Destroy a user
            target: DESTROYED
        - id: DISABLED
          name: Disabled
          definition: id !=null and enabled==false
                action:
                        cafeRESTCall:
                                serviceTypeId: com.vmware.csp.cafe.notification
                                path: api/notifications/send/email
          transitions:
          - event: ENABLE
            action:
                    routine:
                            serviceTypeId: com.vmware.csp.core.o11n.gateway
                            routineId: Enable a user
            target: ENABLED
          - event: ADD_TO_GROUP
            action:
                    routine:
                            serviceTypeId: com.vmware.csp.core.o11n.gateway
                            routineId: Add a user to a user group
          - event: REMOVE_FROM_GROUP
            action:
                    routine:
                            serviceTypeId: com.vmware.csp.core.o11n.gateway
                            routineId: Remove a user from a user group
          - event: CHANGE_A_GROUP
            action:
                    routine:
                            serviceTypeId: com.vmware.csp.core.o11n.gateway
                            routineId: Change a user group
          - event: DESTROY
            action:
                      routine:
                            serviceTypeId: com.vmware.csp.core.o11n.gateway
                            routineId: Destroy a user
            target: DESTROYED
        - id: DESTROYED
          name: Destroyed
          type: end
          transitions:
            - source: CREATED
              event: DESTROY
              action:
                      routine:
                              serviceTypeId: com.vmware.csp.core.o11n.gateway
                              routineId: Destroy a user
              target: DESTROYED
```

The lifecycle definition can also be used to hook operations to specific state transitions. For example, the lifecycle definition for the AD User resource could specify that when an active directory user is created, the AD User resource is to automatically trigger sending of an email to a specified user address to notify the user that the account has been created and what further actions are to be taken. As another example, when the active directory user is enabled, the AD User resource can be defined to automatically trigger a change password routine.

After receiving the resource definition and the lifecycle definition for the custom resource, the service provider 410 publishes the lifecycle definition to the lifecycle manager 470 via an example API call 505 (e.g., such as an example REST API call 505) and publishes the resource definition to the catalog 480 via an example API call 510 (e.g., such as an example REST API call 510). In response to the API call 505, the lifecycle manager 470 creates (e.g., defines) a state machine modeling the lifecycle states and state transitions specified in the received lifecycle definition (e.g., such as the example lifecycle definition illustrated in Table 1). The lifecycle manager 470 also associates each state with the respective event(s) and set of available operations specified in the lifecycle definition, and then initializes the state machine to its starting lifecycle state. In response to the API call 510, the catalog 480 creates a catalog item for the custom resource using the name and details specified in the resource definition. The catalog 480 then makes the catalog item available to customers via a catalog interface.

Next, in response to a customer accessing the catalog item for the custom resource, the catalog 480 queries the lifecycle manager 470 via an example message 515 (e.g., such as a REST API call 515) to request the set of operations available for the custom resource in its current operating state. In response to the query, the lifecycle manager 470 evaluates the state machine for the custom resource to identify the resource's current lifecycle state. Then, the lifecycle manager 470 returns the custom resource's current lifecycle state and the set of available operations defined for that lifecycle state to the catalog 480 via an example message 520 (e.g., such as a REST API call 520). In response to the message 520, the catalog 480 updates the catalog item for the custom resource to present the set of operations available for the custom resource in its current lifecycle state. For example, if the custom resource is the example AD User resource described above and its current state is "created," the catalog item for the AD User resource may be updated to indicate the available operations are "enable" and "disable" in the resource's current state (which is "created" in this example).

Next, in response to the customer selecting a particular operation of the custom resource to be performed, the catalog 480 sends an example message 525 (e.g., a REST API call 525) to the lifecycle manager 470 identifying the selected operation of the custom resource to be performed. For example, the selected operation could be the "enable" operation for the AD User resource described above. In response to the message 525, the lifecycle manager 470 evaluates the state machine for the custom resource to verify the selected operation can be performed in the current state of the custom resource. Assuming the selected operation is verified (e.g., the "enable" operation is permitted for the AD User resource when in the "created" lifecycle state), the lifecycle manager 470 then sends an example message 530 (e.g., a REST API call 525) to the service provider 410 to instruct the service provider 410 to execute the selected operation. In response to the message 530, the service provider 410 invokes any appropriate XaaS functionality to execute the selected operation.

After the selected operation is executed, the service provider 410 returns an example message 535 (e.g., a REST API call 535) to the lifecycle manager 470 to confirm the selected operation was performed. In response to the message 535, the lifecycle manager 470 evaluates the state machine being maintained for the custom resource to update the current state of the custom resource according to the selected operation that was executed (e.g., to update the state of the AD User resource to "enabled" in this example) The lifecycle manager 470 also returns an example message 540 (e.g., a REST API call 540) to the catalog 480 to confirm the selected operation was performed. The catalog 480 then presents this confirmation to the customer via its catalog interface. The example message sequence diagram 500 then ends.

The example message sequence diagram 600 of FIG. 6 includes similar messaging as illustrated in the example message sequence diagram 500 of FIG. 5. Accordingly, like elements are identified with the same reference numerals in the two figures. However, in the illustrated example of FIG. 6, the lifecycle manager 470 also invokes the event broker 430 to publish events associated with custom resources being managed by the lifecycle manager 470, and to receive responses from system components subscribed to receive events associated with the custom resources.

For example, in the message sequence diagram 600 of FIG. 6, after verifying the selected operation identified in the message 525 can be performed in the current state of the custom resource, but before sending the message 530, the lifecycle manager 470 of the illustrated example sends an event 605 to the event broker 430 via an example API call (e.g., such as a REST API call). The event 605 indicates the selected operation for the custom resource is to be performed. For example, the event 605 could be a "pre-enable" event if the "enable" operation has been selected for the AD User resource described above. The event broker 430 then publishes the event 605 to inform subscribed components of the cloud computing environment that the identified operation for the custom resource has been selected for execution. As noted above, the event broker 430 provides a messaging mechanism for event-based communication among system components. For example, the event broker 430 can implement any appropriate event-based messaging mechanism allowing system components, such as resources, processes, users, etc., to subscribe to receive event notifications associated with custom resources managed by the lifecycle manager 470.

In the illustrated example of FIG. 6, after publishing the event 605, the event broker 430 reports an example message 610 (e.g., a REST API call 605) to the lifecycle manager 470, which includes any responses to the event 605 that were received from the subscribed system components. In some examples, the lifecycle manager 470 evaluates these responses to further validate whether the selected operation is available to be performed during the current lifecycle state of the custom resource. Additionally or alternatively, in some examples, the lifecycle manager 470 evaluates these responses to update the current lifecycle state of the custom resource according to the state machine being maintained by the lifecycle manager 470 for the custom resource. Assuming the selected operation remains valid, the messaging proceeds to message 530 as described above.

Similarly, in the message sequence diagram 600 of FIG. 6, after receiving the message 535 confirming the selected operation was performed, but before sending the message 540, the lifecycle manager 470 of the illustrated sends an event 615 to the event broker 430 via an example API call (e.g., such as a REST API call). The event 615 indicates the selected operation for the custom resource has been performed. The event broker 430 then publishes the event 615 to inform subscribed components of the cloud computing environment that the identified operation for the custom resource has been executed. For example, the event 615 could be a "post-enable" event if the "enable" operation has been executed for the AD User resource described above.

In the illustrated example of FIG. 6, after publishing the event 615, the event broker 430 reports an example message 620 (e.g., a REST API call 620) to the lifecycle manager 470, which includes any responses to the event 615 that were received from the subscribed system components. In some examples, the lifecycle manager 470 evaluates these responses to further validate whether the execution of the selected operation should be confirmed, or if other action should be taken. Additionally or alternatively, in some examples, the lifecycle manager 470 evaluates these responses to update the current lifecycle state of the custom resource according to the state machine being maintained by the lifecycle manager 470 for the custom resource. Assuming the execution of the selected operation should still be confirmed, the messaging proceeds to message 540 as described above. The example message sequence diagram 600 then ends.

Based on the foregoing description, the example lifecycle service implemented by the example vA 320 provides many features for managing lifecycles of custom resources. For example, such lifecycle services disclosed herein allow resource providers to register (e.g., via the service provider 410) custom resource and lifecycle definitions for custom resources. Disclosed example lifecycle services also enable resource providers to register a lifecycle definition that includes states, transitions between the states, events which trigger the transitions, operations to execute on transition and/or on state change, etc. Disclosed example lifecycle services also enable resource providers to send signals (events) to a messaging system (e.g., the event broker 430) for a managed custom resource, and enable third party systems (including resource providers and other external systems) to get (e.g., by querying the lifecycle manager 470) the current state(s) for given managed custom resource and a list possible signals which the state machine accepts for the current life cycle state for the given managed custom resource. Disclosed example lifecycle services further enable third party systems to get (e.g., by querying the lifecycle manager 470) a list operations available for a given state.

Thus, the example lifecycle service implemented by the example vA 320 enables creation of custom resources to enhance/augment the existing code base of the cloud computing environment by specifying resource and lifecycle definitions without modifying the existing code base of the cloud computing environment. Furthermore, as new functionality (e.g., new container functionality, new VM functionality, etc.) is integrated into the code base of the cloud computing environment, new custom resources can be created to enhance/augment this functionality by specifying the resource and lifecycle definitions for these new custom resources. Moreover, as noted above, the example lifecycle service implemented by the example vA 320 enables registration of custom resources to be performed by publishing the resource and lifecycle definitions for the custom resources to the appropriate system components, which does not cause any service down time, at least in some examples.

While an example manner of implementing lifecycle management of custom resources in a cloud computing environment is illustrated in FIGS. 1-6, one or more of the elements, processes and/or devices illustrated in FIGS. 1-6 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example database 460, example lifecycle manager 470, example catalog 480 and/or, more generally, the example systems 100 and/or 300 of FIGS. 1-6 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example database 460, example lifecycle manager 470, example catalog 480 and/or, more generally, the example systems 100 and/or 300 of FIGS. 1-6 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example database 460, example lifecycle manager 470, example catalog 480 and/or, more generally, the example systems 100 and/or 300 of FIGS. 1-6 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example database 460, example lifecycle manager 470, example catalog 480 and/or, more generally, the example systems 100 and/or 300 of FIGS. 1-6 may include one or more elements, processes and/or devices in addition to, or instead of, those illustrated in FIGS. 1-6, and/or may include more than one of any or all of the illustrated elements, processes and devices.

Figure 7:
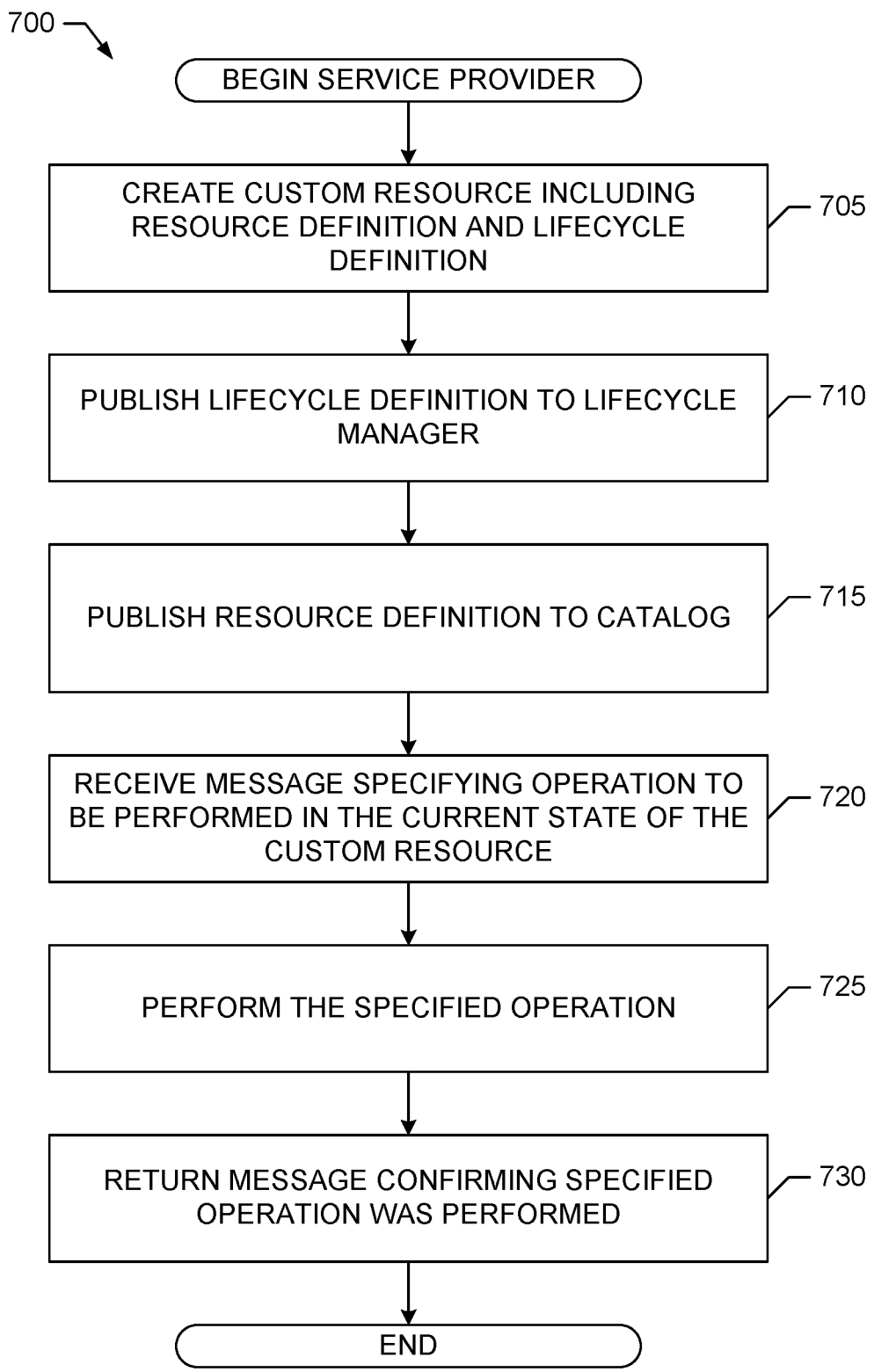
FIG. 7 is a flowchart representative of example computer readable instructions that may be executed to implement an example service provider of the example virtual appliance of FIG. 4.
Figure 8:
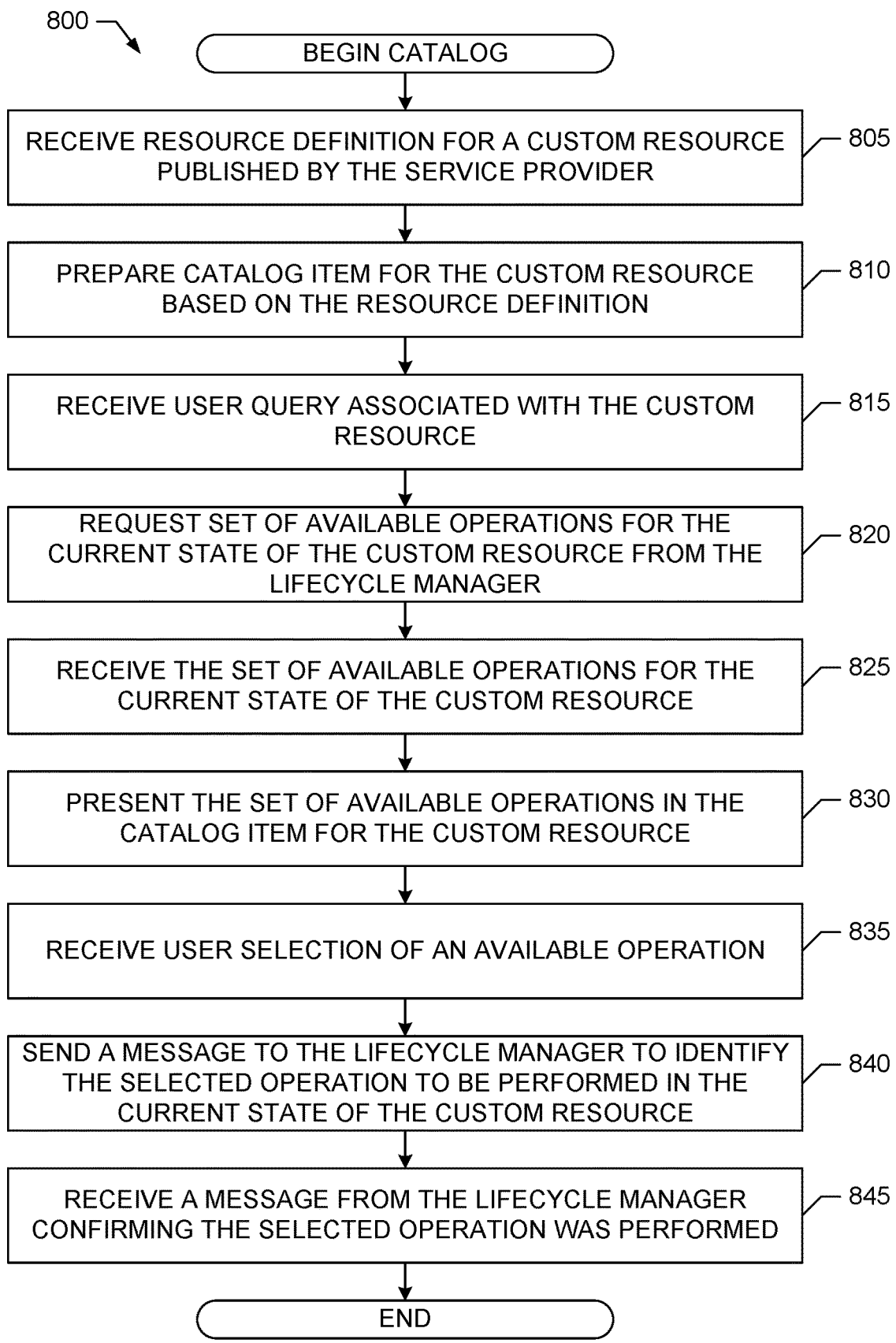
FIG. 8 is a flowchart representative of example computer readable instructions that may be executed to implement an example lifecycle manager of the example virtual appliance of FIG. 4.
Figure 9:
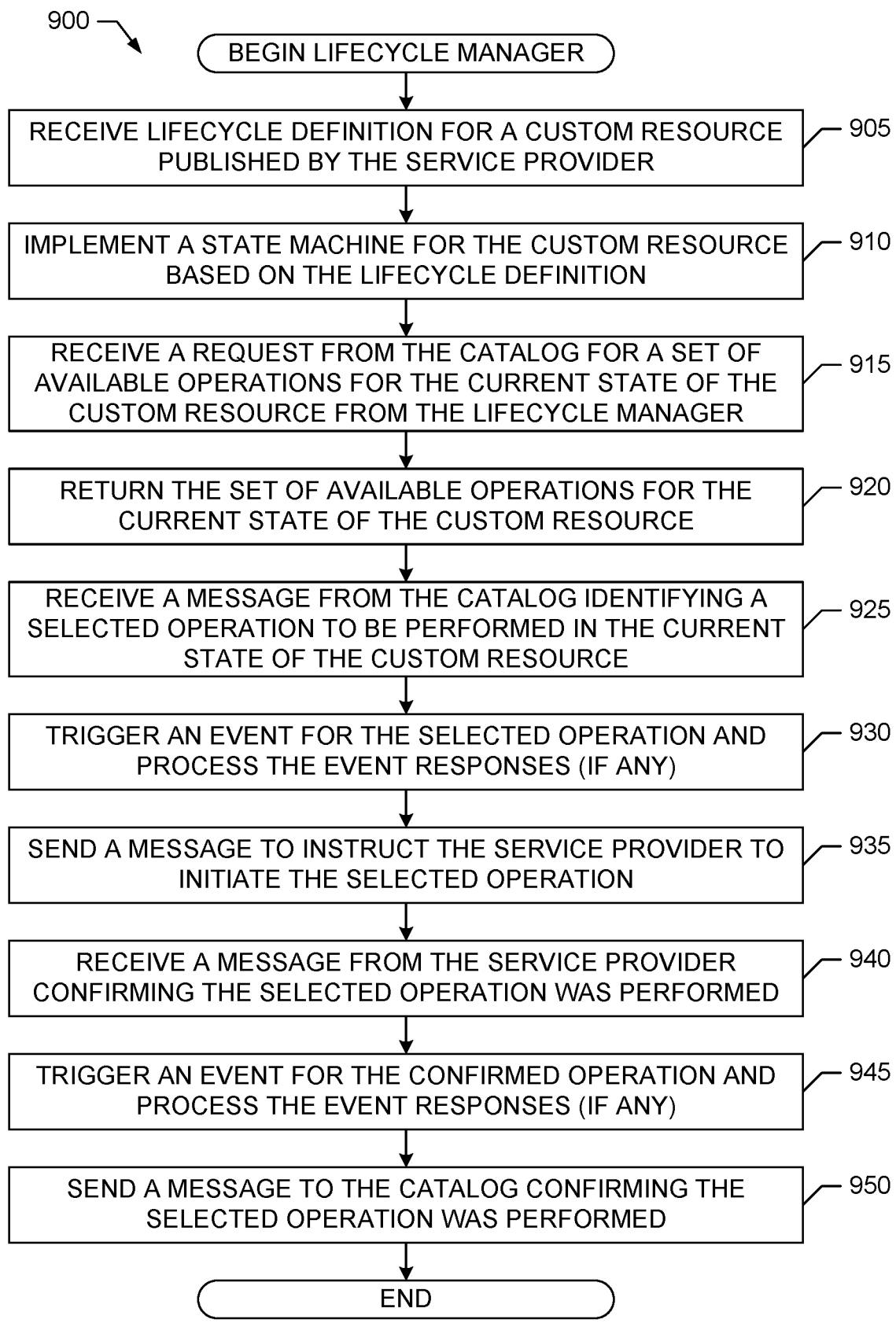
FIG. 9 is a flowchart representative of example computer readable instructions that may be executed to implement an example catalog of the example virtual appliance of FIG. 4.

Flowcharts representative of example machine readable instructions that may be executed to implement the example virtual appliances 320, example service provider 410, example orchestrator 420, example event broker 430, example authentication provider 440, example internal reverse proxy 450, example database 460, example lifecycle manager 470, example catalog 480, and/or to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-6 are shown in FIGS. 7-9. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 7-9, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 depicts a flowchart representative of computer readable instructions that may be executed to implement the lifecycle management functionality provided by the example service provider 410 of the example vA 320 of FIG. 4. An example program 700 is illustrated in FIG. 7. Initially, at block 705, the service provider 410 accepts a resource definition and a lifecycle definition from a customer to create a custom resource, as described above. At block 710, the service provider 410 publishes the lifecycle definition to the example lifecycle manager 470 of the vA 320, as described above. At block 715, the service provider 410 publishes the resource definition to the example catalog 480 of the vA 320, as described above. At block 720, the service provider 410 receives a message from the lifecycle manager 470 specifying a selected operation to be performed in the current state of the custom resource. At block 725, the service provider 410 invokes the appropriate XaaS functionality to perform the specified operation, as described above. At block 730, the service provider 410 returns a message confirming the specified operation of the custom resource was performed.

FIG. 8 depicts a flowchart representative of computer readable instructions that may be executed to implement the lifecycle management functionality provided by the example catalog 480 of the example vA 320 of FIG. 4. An example program 800 is illustrated in FIG. 8. Initially, at block 805, the catalog 480 receives a resource definition for a custom resource from the example service provider 410 of the vA 320. At block 810, the catalog 480 prepares a catalog item for the custom resource based on the received resource definition, as described above. At block 815, the catalog 480 receives, via a catalog interface presenting the catalog item, a user query associated with the custom resource. At block 820, the catalog 480 queries the example lifecycle manager 470 of the vA 320 to request a set of available operations for the current state of the custom resource, as described above. At block 825, the catalog 480 receives a response from the lifecycle manager 470 with the set of operations for the current state of the custom resource, as described above.

At block 830, the catalog 480 updates the catalog item for the custom resource to present the set of available operations for the current state of the custom resource, as described above. At block 835, the catalog 480 receives a user selection of an available operation included in the set of available operations presented in the catalog item for the custom resource. At block 840, the catalog 480 sends a message to the lifecycle manager 470 identifying the selected operation to be performed in the current state of the custom resource. At block 845, the catalog 480 receives a message from the lifecycle manager 470 confirming the specified operation of the custom resource was performed.

FIG. 9 depicts a flowchart representative of computer readable instructions that may be executed to implement the lifecycle management functionality provided by the example lifecycle manager 470 of the example vA 320 of FIG. 4. An example program 900 is illustrated in FIG. 9. Initially, at block 905, the lifecycle manager 470 receives a lifecycle definition for a custom resource from the example service provider 410 of the vA 320, as described above. At block 910, the lifecycle manager 470 implements, as described above, a state machine modeling the lifecycle of the custom resource using the received lifecycle definition. At block 915, the lifecycle manager 470 receives a query from the example catalog 480 of the vA 320 requesting a set of available operations for the current state of the custom resource, as described above. At block 920, the lifecycle manager 470 evaluates the state machine for the custom resource to identify the set of available operations for the resource's current state, and returns a response to the catalog 480 with the set of operations for the current state of the custom resource, as described above.

At block 925, the lifecycle manager 470 receives a message from the catalog 480 identifying a selected operation to be performed in the current state of the custom resource, as described above. At block 930, the lifecycle manager 470 triggers, via the example event broker 430 of the vA 320, an event for initiating the selected operation, and processes the response(s), if any, received, via the example event broker 430, from any system component(s) responding to the event, as described above. At block 935, the lifecycle manager 470 sends a message to instruct the service provider 410 to perform the selected operation, as described above. At block 940, the lifecycle manager 470 receives a message from the service provider 410 confirming the selected operation was performed. At block 945, the lifecycle manager 470 triggers, via the example event broker 430 of the vA 320, an event for confirming performance of the selected operation, and processes the response(s), if any, received, via the example event broker 430, from any system component(s) responding to the event, as described above. At block 950, the lifecycle manager 470 sends a message to the catalog to confirm the selected operation for the custom resource was performed, as described above.

Figure 10:
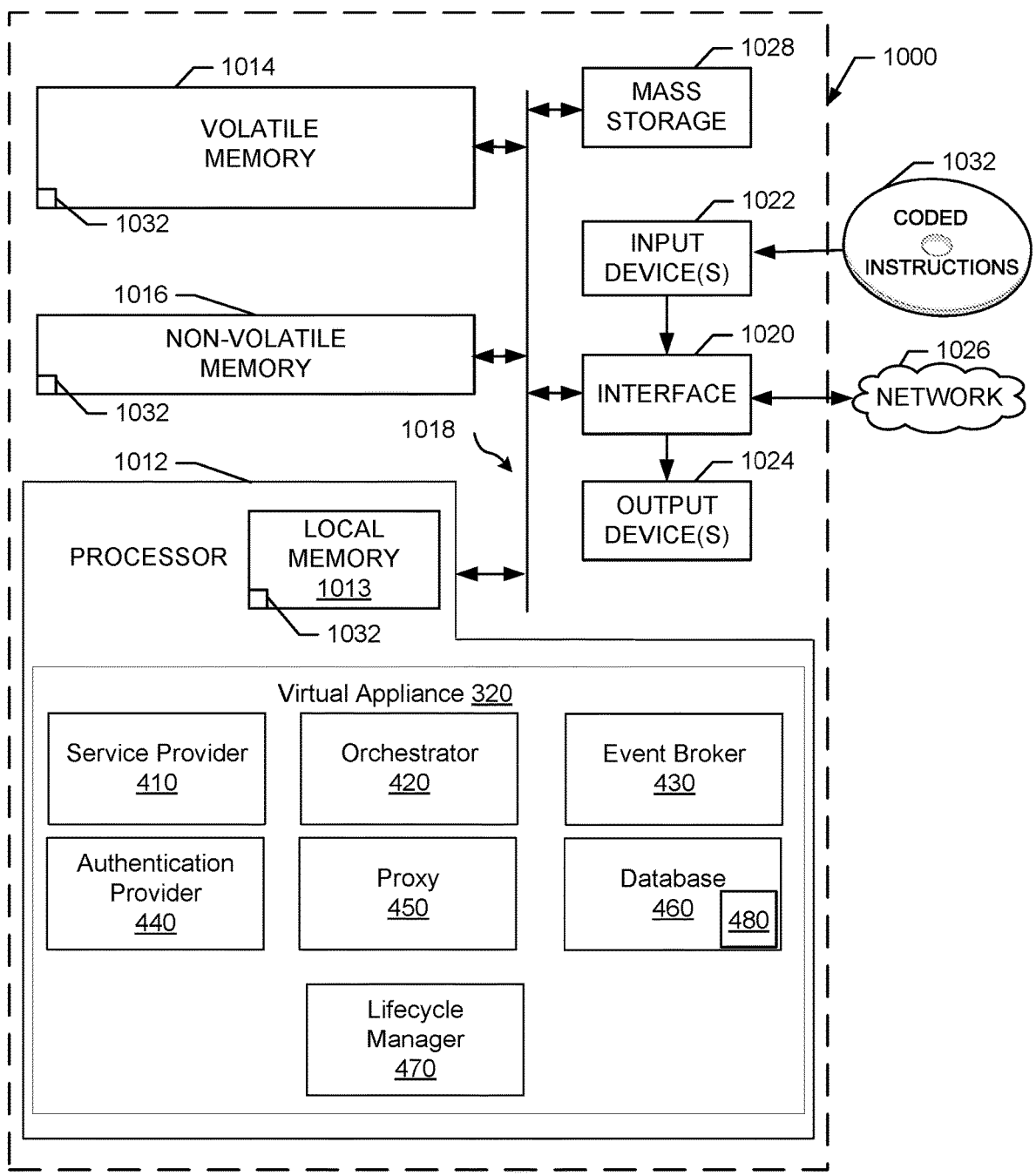
FIG. 10 is a block diagram of an example processing platform structured to execute the example computer readable instructions of FIGS. 7, 8 and/9 to implement the example virtual appliance of FIG. 4.

FIG. 10 is a block diagram of an example processor platform 1000 structured to execute the instructions of FIGS. 7-9 to implement the example systems, operation, and management of FIGS. 1-6. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the vA 320-324, component server 330-336, management endpoint 340-344, and management agent 350-356. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 7-9 may be stored in the mass storage device 1028, in the volatile memory 1014, in the non-volatile memory 1016, and/or on a removable tangible computer readable storage medium such as a CD or DVD.

In certain examples, the processor 1012 can be used to implement the virtual appliance 320 (and vAs 322-324) and the component server 330 (and servers 332-336) and their components including the service provider 410, orchestrator 420, event broker 430, authentication provider 440, proxy 450, database server 460, lifecycle manager 470, catalog 480, etc. In certain examples, as discussed herein, the hardware of processor 1012 is virtualized using virtualization such as VMs and/or containers. In the example of FIG. 10, the virtual appliance 320 can be implemented by one or more VMs or containers, so as to virtualize the hardware of processor 1012.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An appliance comprising:
  memory; and
  processor circuitry to execute computer readable instructions to:
    obtain a resource definition of a custom resource to be executed in a cloud computing environment;
    manage a lifecycle of the custom resource based on a state machine, the state machine to represent a set of lifecycle states of the custom resource;
    obtain a set of one or more operations available to execute in a current lifecycle state of the custom resource;
    update a catalog item for the custom resource to present the set of one or more operations available to execute in the current lifecycle state of the custom resource, the catalog item created based on the resource definition of the custom resource;
    in response to selection of a first operation in the set of one or more operations, publish a first event to a plurality of components of the cloud computing environment that are subscribers to receive events associated with the custom resource, the first event to inform the plurality of components of the cloud computing environment that the first operation has been selected to be executed;

after publication of the first event, evaluate one or more responses from one or more of the plurality of components of the cloud computing environment to validate whether the first operation is available to execute in the current lifecycle state of the custom resource;

send, in response to a determination that the first operation is valid, a first message to cause execution of the first operation; and at least one of (i) present a confirmation that the first operation was executed in response to a second message, or (ii) publish a second event after the first event, the second event to inform the plurality of components of the cloud computing environment that the first operation has been executed.

2. The appliance of claim 1, wherein the resource definition includes a name of the custom resource and details of the custom resource to be presented in the catalog item for the custom resource.

3. The appliance of claim 1, wherein the processor circuitry is to identify the current lifecycle state of the custom resource.

4. The appliance of claim 1, wherein the processor circuitry is to:
present the set of one or more operations available to execute in the current lifecycle state of the custom resource in response to a user query corresponding to the custom resource; and
present the confirmation that the first operation was executed in response to a user selection of the first operation.

5. A method for custom resource lifecycle management, the method comprising:
determining, by executing an instruction with a virtual appliance, a current lifecycle state of a custom resource based on a state machine, the state machine to represent a set of lifecycle states of the custom resource, the custom resource to be executed in a cloud computing environment;
determining, by executing an instruction with the virtual appliance, a set of one or more operations available to execute in the current lifecycle state of the custom resource;
updating, by executing an instruction with the virtual appliance, a catalog item for the custom resource to present the set of one or more operations available to execute in the current lifecycle state of the custom resource, the catalog item created based on a resource definition of the custom resource;
in response to selection of a first operation in the set of one or more operations, publishing, by executing an instruction with the virtual appliance, a first event to a plurality of components of the cloud computing environment that are subscribers to receive events associated with the custom resource, the first event to inform the plurality of components of the cloud computing environment that the first operation has been selected to be executed;
after the publishing of the first event, evaluating, by executing an instruction with the virtual appliance, one or more responses from one or more of the plurality of components of the cloud computing environment to validate whether the first operation is available to execute in the current lifecycle state of the custom resource; and sending, in response to determining the first operation is valid, a message to cause execution of the first operation.

6. The method of claim 5, wherein the resource definition includes a name of the custom resource and details of the custom resource to be presented in the catalog item for the custom resource.

7. The method of claim 5, further including receiving a confirmation that the first operation was executed.

8. The method of claim 7, further including:
implementing a catalog interface;
presenting, with the catalog interface, the set of one or more operations available to execute in the current lifecycle state of the custom resource in response to a user query corresponding to the custom resource; and
presenting, with the catalog interface, the confirmation that the first operation was executed subsequent to a user selection of the first operation.

9. The method of claim 5, further including, after publishing the first event, publishing a second event to inform the plurality of components of the cloud computing environment that the first operation has been executed.

10. A non-transitory computer readable medium comprising computer readable instructions that, when executed, cause a virtual appliance to at least:
determine a current lifecycle state of a custom resource based on a state machine, the state machine to represent a set of lifecycle states of the custom resource, the custom resource to be executed in a cloud computing environment;
determine a set of one or more operations available to execute in the current lifecycle state of the custom resource;
update a catalog item for the custom resource to present the set of one or more operations available to execute in the current lifecycle state of the custom resource, the catalog item created based on a resource definition of the custom resource;
in response to selection of a first operation in the set of one or more operations, publish a first event to a plurality of components of the cloud computing environment that are subscribers to obtain events associated with the custom resource, the first event to inform the plurality of components of the cloud computing environment that the first operation has been selected to be executed;
after publication of the first event, evaluate one or more responses from one or more of the plurality of components of the cloud computing environment to validate whether the first operation is available to execute in the current lifecycle state of the custom resource; and
send, in response to a determination that the first operation is valid, a message to cause execution of the first operation.

11. The non-transitory computer readable medium of claim 10, wherein the resource definition includes a name of the custom resource and details of the custom resource to be presented in the catalog item for the custom resource.

12. The non-transitory computer readable medium of claim 10, wherein the instructions, when executed, further cause the virtual appliance to receive a confirmation that the first operation was executed.

13. The tangible non-transitory computer readable medium of claim 12, wherein the instructions, when executed, further cause the virtual appliance to:
implement a catalog interface;
present, with the catalog interface, the set of one or more operations available to execute in the current lifecycle state of the custom resource in response to a user query corresponding to the custom resource; and present, with the catalog interface, the confirmation that the first operation was executed subsequent to a user selection of the first operation.

14. The non-transitory computer readable medium of claim 10, wherein the instructions, when executed, further cause the virtual appliance to publish a second event after the first event, the second event to inform the plurality of components of the cloud computing environment that the first operation has been executed.

15. The non-transitory computer readable medium of claim 10, wherein the instructions, when executed, further cause the virtual appliance to update the current lifecycle state of the custom resource based on the state machine after the first operation has been executed.

* * * * *